United States Patent [19]
Escobosa

[11] 4,296,911
[45] Oct. 27, 1981

[54] HYDRAULIC CONTROLLED SONIC INDUCTION SYSTEM

[76] Inventor: Alfonso S. Escobosa, 2034 Brittany Pl., Placentia, Calif. 92670

[21] Appl. No.: 10,001

[22] Filed: Feb. 7, 1979

[51] Int. Cl.³ .......................... F16V 31/122; F01L 1/34; F01L 9/02

[52] U.S. Cl. .......................... 251/57; 92/86; 60/591; 60/594; 123/90.12; 123/90.15; 123/90.55; 277/3; 277/27; 277/29; 251/DIG. 1

[58] Field of Search .......................... 251/57, DIG. 1; 123/90.12, 90.13, 90.14, 90.15, 90.55; 277/29, 3, 27; 60/537, 583, 591, 594; 92/86

[56] References Cited

U.S. PATENT DOCUMENTS

| | | | |
|---|---|---|---|
| 2,329,662 | 9/1943 | Steiner | 123/90.12 |
| 3,216,451 | 11/1965 | Smallpiece | 251/DIG. 1 |
| 3,490,423 | 1/1970 | Shunta et al. | 123/90.55 |
| 3,612,015 | 10/1971 | Hausknecht | 123/90.12 |
| 3,742,921 | 7/1973 | Rendine | 123/90.55 |
| 3,865,015 | 2/1975 | Hakansson | 92/86 |
| 3,895,815 | 7/1975 | Panigati | 251/DIG. 1 |
| 4,020,806 | 5/1977 | Aoyama et al. | 123/90.55 |
| 4,106,446 | 8/1978 | Yamada et al. | 123/90.12 |
| 4,134,371 | 1/1979 | Hausknecht | 123/90.15 |
| 4,153,016 | 5/1979 | Hausknecht | 123/90.55 |
| 4,206,728 | 6/1980 | Trenne | 123/90.12 |

*Primary Examiner*—Martin P. Schwadron
*Assistant Examiner*—G. L. Walton

[57] ABSTRACT

This invention relates to hydraulic control of intake valves and fuel injection of spark ignited internal combustion engines to effect a sonic-type induction system. The invention is an extension of a previous application by the same inventor, which provides a hydraulic actuation system for a prescribed valve opening of all the engine valves. The new system, in substance, provides a means to divert, in varying amounts, actuation fluid as supplied by the former system so as to impart a variable lift to the intake valves and, proportionally, to the fuel injection metering valve(s). The result is an induction system capable of maintaining an accurate air-to-fuel mass ratio.

4 Claims, 6 Drawing Figures

HYDRAULIC CONTROLLED SONIC INDUCTION SYSTEM

CROSS REFERENCES

This patent application is a copending application with an earlier application by the inventor entitled, "Hydraulic Actuation System for Engine Valves", for which a filing date of May 25, 1978 and a Ser. No. of 909,650 has been assigned, is now U.S. Pat. No. 4,244,553. The new invention performs the added function of controlled engine induction using the framework of the original actuation system. The original system will be hereafter referred to as the "baseline actuation system".

SUMMARY OF THE INVENTION

This invention relates to hydraulic control of intake valves and fuel injection to effect a sonic induction system for spark ignited internal combustion engines. The invention is an extension of a previous disclosure by the same inventor which provides a hydraulic actuation system for a prescribed valve opening profile of all the engine valves. The new system, in substance, provides a means to divert, in varying amounts, actuation fluid as supplied by the former system so as to impart a variable lift to the intake valves and, proportionally, to the fuel injection metering valve(s) of the overall induction system.

The idea of throttling engines by means of the intake valves is not new and the advantages are generally understood by the automotive community. What is new is (1) the unique method by which throttling control is achieved which results in a low cost system that offers improved control accuracy, freedom from maintenance requirements and high-speed operation, and (2) the applicability of the method to fuel injection control to form a uniquely integrated induction system.

The valve lift control strategy uses a displacement limited member and a biased member, any one of which is the valve actuator and the other a bypass piston. These members are jointly controlled so that actuation fluid supplied by cam follower flow sources is diverted through the bypass piston to effect variable valve lift. While one member is hydraulically biased and initially prevented from moving, the other member moves until hydraulically stopped. If the biased member is the bypass piston, the displacement limited member (the valve actuator) opens the valve until stopped at which point the remainder of the actuation fluid is bypassed by the bypass piston. If, on the other hand, the biased member is the valve actuator, the displacement limited member (the bypass piston) provides bypass until stopped, at which point the remainder of the actuation fluid opens the valve. In both cases the reversal of the actuation fluid completes the actuation cycle. With the bypass piston biased, a clipped-top (pedestal shaped) valve opening profile is produced whereas with the valve actuator biased, a raised-base (crest shaped) profile is produced.

A non-obvious observation allows two hydraulic circuits to be combined resulting in a significant simplification, but with a reduction in the allowable operating speed of the system.

Another non-obvious observation allows the stop function (for the case where the stop function is performed by the bypass piston) to be advantageously altered.

The actual intake valve actuator can be borrowed to provide the required actuation for the subsystem's fuel metering valve(s). If, in this case, each of the metering valves is individually actuated, each metering valve opening profile is an attenuated replica of the corresponding intake valve opening profile and as such forms the basis for a complete induction system capable of maintaining an accurate air-to-fuel mass ratio.

DESCRIPTION OF THE DRAWINGS

In the description of the invention reference is made to the accompanying drawings in which:

In FIGS. 1 through 4 the short lines terminating in arrowheads indicate connections to additional valve control units.

DESCRIPTION OF THE INVENTION

Background

Figure 1:
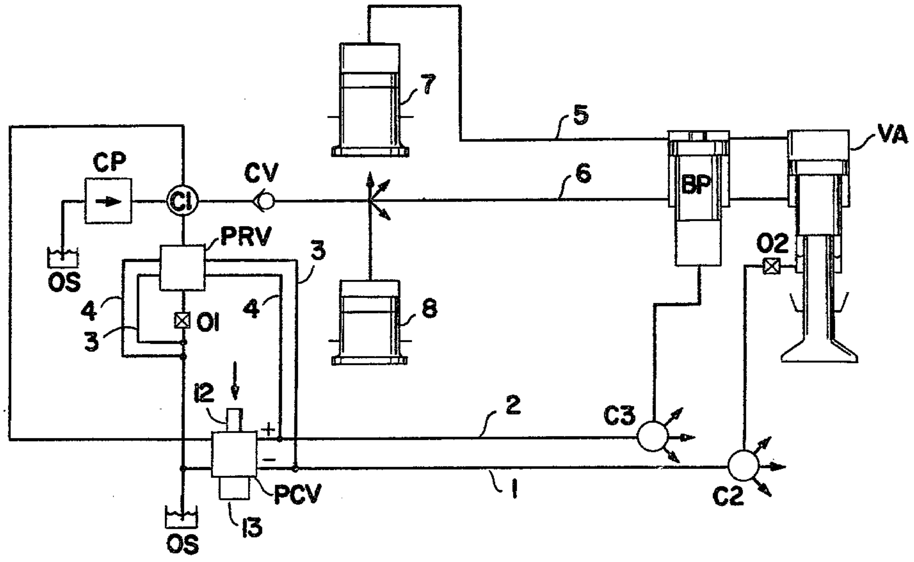
FIG. 1 shows in functional diagram form a one-valve model of the control system which produces a clipped-top (pedestal shaped) valve opening profile.

The use of intake valves to throttle an engine is not new. Aside from the high cost of implementing the concept, significant advantages have been demonstrated. Test results have indicated that the turbulent combustion so produced permits extremely lean part-load air/fuel mixtures (in excess of 20:1) without incurring the consequences of cyclic variations in cylinder pressure development.

The impetus for throttling the engine with the intake valves originated in the hypothesis that increasing the intensity of the small scale turbulence within the combustion chamber would effect an accelerated flame propagation rate during the period immediately following ignition. This was found to be the case with such throttling resulting in sonic inflow velocity from idle to approximately $\frac{2}{3}$ load.

All current emission control strategies, particularly those using heavy exhaust gas recirculation, rely on or are greatly aided by turbulence generating techniques. However, with carburetor throttling and conventional squish and swirl techniques the turbulence produced is weak and large scale at part-load and intensifies only at high engine speeds. With intake valve throttling, strong turbulence can be produced over all engine operating conditions and provides greater leeway for reducing the three major pollutants as well as reducing fuel consumption.

Cold weather detrimental factors are known to be diminished as fuel dribble passing through the small valve aperature undergoes almost explosive atomization due to the high shear forces to which it is subjected. Under this condition, only a slight enrichment of the air/fuel mixture is required. In methanol-fueled engines, sonic throttling teamed with fuel injection should eliminate the cold starting problem of such engines.

Lately, another impetus for throttling the engine by means of the intake valves has emerged. This impetus stems from the possibility that one such system may be contrived which allows an "early closing" type of valve control. If this were practical, a significant fuel saving in addition to that made possible by sonic throttling can be achieved in the idle and light load range of operation. What is sought here is an intake valve opening which is limited to the time the pressure difference across the valve is low (so as to reduce throttling losses) but still high enough to produce sonic or near sonic flow.

Another development somewhat related to early valve closing is partial or total valve closure for the purpose of configuring a dual displacement engine. Engine operation with half the number of cylinders reduces part-load throttling losses and adds to the increased efficiency made possible with early valve closing.

Finally, a strong impetus stems from the possibility of integrating the control of valve throttling and fuel injection with a consequent significant cost reduction to the overall system.

Objectives

The primary advantages of the induction system which are sought include the following:

1. Reduced complexity and cost of implementing the variable valve lift concept.
2. Life-time freedom of wear effects and maintenance requirements.
3. Combined features of sonic throttling and early part-load valve closing.
4. The capability of utilizing a common control strategy for both intake valve throttling and fuel injection.
5. A flexible control scheme which can be adopted to provide a dual displacement engine.
6. Retainment to a large degree of the superior high speed performance capability of the base-line actuation system.

System Components

Initially, only that portion of the induction system which provides throttling control will be described. The portion that provides fuel control will be described later in another section.

The throttling control system components are, for the large part, shared by the systems of FIGS. 1, 2, 3 and 4. Thus, only those for FIG. 1 will be described to great length.

Referring to FIG. 1, there is a hydraulic charging pump, CP, a pressure release valve, PRV, and a flow restricting orifice, O1, for the purpose of generating a pressure source that varies non-linearly with engine speed. Pressure from this pump circuit is applied to the valve-closing control line 6 through check valve CV and to the supply pressure port of the 4-way pressure control valve, PCV, which varies the pressure in lift control line 1, and in bias control line 2, in proportion to the displacement of shaft 12, which varies with the force applied with the accelerator pedal. Pressure in the lift control line acting through the flow distribution orifice, O2, controls the amount of fluid in the added third chamber of the double-acting valve actuator, VA, and pressure in the bias control line controls the magnitude of bias imparted to the third chamber of the parallel connected auxiliary bypass piston, BP. Lines 3 and 4 connected to the lift control line and bias control line, respectively, lead back to the pressure release valve where, upon its closing motion at engine turn off, results in the shorting of these lines to return pressure as indicated by oil sump, OS. The valve actuator and the auxiliary bypass piston are connected in parallel through valve-opening control line 5 and valve-closing control line 6 to the cam follower flow sources 7 and 8, respectively. The ratio of the valve-opening piston areas to the valve-closing piston areas for the valve actuator, the bypass piston and the cam follower pistons are all equal. With the exception of the 4-way pressure control valve, the bypass piston, the added third chamber in the valve actuator and all associated circuits, the system configuration is that of the baseline actuation system.

Elements symbolized by circles and labeled C1, C2 and C3 represent intentional fluid compliances which can be enhanced by increasing the volume of fluid in the corresponding lines. Flow distribution orifice O2 allows only a small amount of fluid to enter and exit the added third chamber during an actuation cycle. This restriction results in cavitation in the chamber whenever the valve actuator is made to move in the direction which expands the chamber volume.

The 4-way control valve can take many forms; although, the popular spool valve with one end pushrod-actuated and the other end restrained with a compression-biased spring is a logical choice. Since pressure control is required throughout the operating range of the control valve, the two pairs of variable-length, fixed-width orifices of the spool/sleeve assembly should have areas which are continuously exposed. An alternate spool/sleeve assembly is one having two pairs of continuously overlapped lands, where the lands are intentionally leaky annular seals of constant width (spool circumference) and variable length (spool displacement). The latter approach relies on differential changes in laminar flow resistance to effect changes in control port pressures. This design at first appears highly sensitive to temperature variations; however, since the load also consists of seals having laminar flow resistances, the source and load resistances will track and negligible pressure change will result. This feature allows an internal leakage level which need not be set high in comparison to the actuator and auxiliary piston seal leakages and thus, is more in line with the general philosophy of the baseline system, which eliminates or minimizes fluid throttling losses.

The size and offsets of the individual land areas for each of the control ports can be tailored to produce the desired pair of pressure gain curves. However, if a negligible gain on the bias control side is desired, the line may be directly connected to the supply pressure through a fixed orifice. The control valve would now be configured as a 3-way valve which will hereafter be considered a special case of the more general 4-way valve.

Basic Lift Control Principle

The valve lift control strategy combines two interacting members; a displacement limited member and a biased member, one which is the valve actuator and the other the auxiliary bypass piston. These members under control of the pressure control valve perform three distinct functions—hold, stop and bypass to accomplish variable valve lift. In the system of FIG. 1, the hold function is accomplished by the bias pressure in the third chamber of the bypass piston and initially prevents the motion of that member. The valve actuator, however, moves freely in accordance to the prescribed flow rates of the complementary cam follower flow sources. The stop function is effected at the third chamber of the valve actuator and takes place once the chamber cavity volume is diminished by the opening motion of the valve. The bypass function is the result of the stop function and is effected by the downward motion of the bypass piston against the opposing force of the holding bias. This function allows the fluid supplied by the cam follower pistons to bypass the stopped actuator. As the direction of flow from the cam followers reverses, the bias on the bypass piston aids bypass flow and keeps the actuator pegged in its stop position. At the instance the bypass piston seats while being reversed, the actuator is accelerated and set in a closing motion, again causing a cavity in the third chamber to form. Thereafter the actuator is brought to the valve closed position. At this point, the valve-opening cam follower piston is at or near its bottom position and provides the usual drop in the valve-opening circuit pressure. This drop in pressure assures that the required closing force across the actuator piston and the bypass piston is maintained until the valve opening cycle is repeated.

Figure 2:
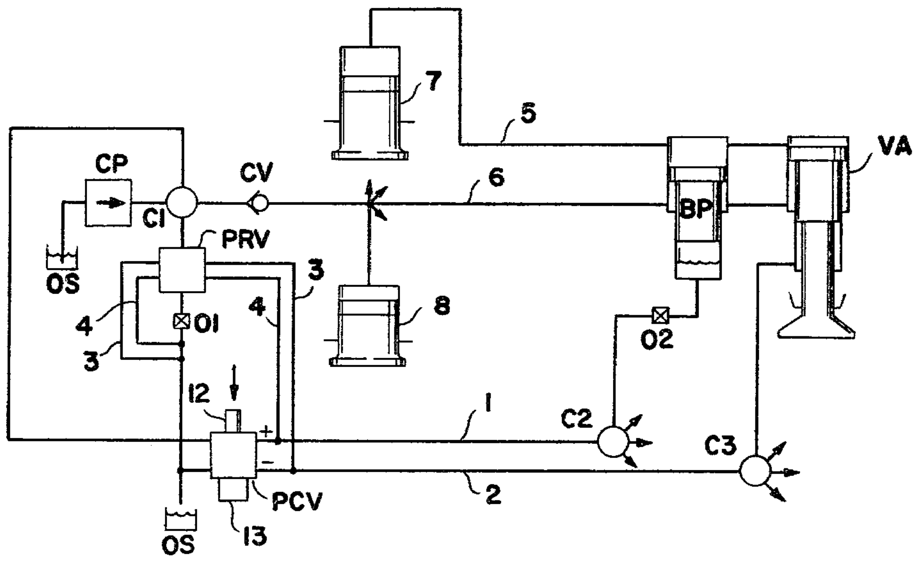
FIG. 2 shows in functional diagram form a one-valve model of the control system which produces a raised-base (crest shaped) valve opening profile.

The lift control strategy applies to the system of FIG. 2, but with a change in the order of actuation. With this system, the valve actuator is first held from moving, allowing the bypass piston to bypass fluid supplied by the cam followers. Bypassing will continue until the bypass piston is stopped at which time the actuator is made to move against the force of the holding bias. The return of the actuator is followed by that of the bypass piston, completing the actuation cycle.

In both the systems of FIGS. 1 and 2, the cavity volume determines the amplitude of the valve opening. In the system of FIG. 1, the lower the lift control pressure, the greater the cavity volume and the greater the valve opening whereas in the system of FIG. 2, the lower the lift control pressure, the greater the cavity volume and the lower the valve opening. This explains why lift control for these systems requires the indicated opposite polarities for the pressure control valve.

In both systems, fluid enters the lift control chamber while the cavity volume is finite and is pushed out when the cavity volume diminishes to zero and fluid is pressurized. The rate of net transfer of fluid across the orifice determines the rate of throttle charge and depends on the relative size of the piston face area of this chamber and on both the lift control and bias control pressures. Assuming 20 valve actuation cycles can be allowed while transversing from idle to wide-open throttle, the net volume of fluid that must be gained or lost during each cycle is only approximately 1/20 of the total displacement volume. This indicates that lift control is efficient even during periods of rapid throttle change.

The stop function may be implemented by a number of alternate methods. For instance, a time-programmed solenoid valve may be used instead of the pressure control valve and the lift control orifice. The solenoid valve would close at the commanded point and reopen at the end of the actuation cycle to allow return pressure fluid to refill the chamber. In another scheme, a rotating shaft, radially ported to allow return pressure fluid to refill the cavity, would block flow during the period the stop function is required. Lift control would be by means of phase control of this shaft relative to the cam shaft. Other schemes such as cam positioning of rigid stops are possible.

Figure 3:
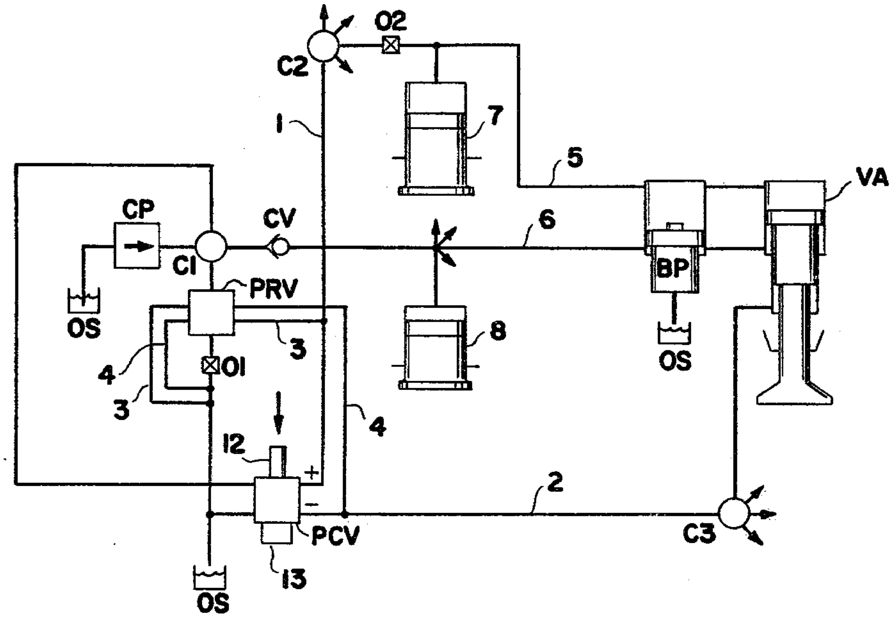
FIG. 3 shows in functional diagram form an alternate version of the system of FIG. 2.

The systems thus far described control the opening of the intake valves by varying the stopping point of the displacement limited members with the volume of fluid in the lift control chambers. For the case of the system of FIG. 2, it is possible to control the opening of the intake valves by varying the starting point of the bypass piston while maintaining a fixed stopping point. A system based on this principle is shown in FIG. 3. The contrasting physical features of this option are: (1) the connection of the flow distribution orifice to the valve-opening circuit to form a combined valve-opening/lift control circuit; (2) the continuously empty lift control chamber which may be simply vented to the oil sump ambient pressure; and (3) the ommission of pressure relieving of the valve-opening circuit by the cam follower piston when it reaches the bottom position. The latter feature is now not necessary and undesirable from a standpoint of valve lift balancing which requires that the flow distribution orifice be the only major point of fluid passage. The contrasting operational features are: (1) the non-return of the bypass piston to its top position (except at the idle operating point); and, (2) the reversal in the pressure control valve polarity. The former feature confines the ratio of the valve-opening pressure to the valve-closing pressure to either of two static levels depending on whether the intake valve is seated or the bypass piston is bottomed. Note that as the intake valve seats and the bypass piston is floated, the resulting drop in pressure ratio provides the desired valve-closing bias. All other operational features thus far described for the system of FIG. 2 apply to this option.

Self-Synchronization and Balancing

The self-priming and self-synchronization of the induction system is identical in principle to that of the baseline actuation system. The process, however, is complicated by the addition of the bypass piston and the third actuator chamber.

From the view point of the cam follower flow sources, the parallel connected valve actuator and auxiliary by-pass piston appear as one member with varying load. Since the sum of the actuator and bypass piston displacements must equal those of the cam followers, both members, once moved from their initial position, will be returned to this position although not at the same time. Once returned, the action of the charging pump pressure and the release of the valve-opening pressure will assure that they remain in this position prior to the start of another actuation cycle. Thus both members are simultaneously synchronized with respect to the prescribed cam follower motion.

In multiple cylinder engines, the pressure control valve is shared and balancing of the intake valve openings is by means of the individual flow distribution orifices. In the systems described, a relatively wide opening at one intake valve will result in a corresponding longer stop period in which fluid gets pushed out of the corresponding lift control chamber (or valve-opening/lift control circuit as in FIG. 3) through the flow distribution orifice. Since the difference results in a reduced subsequent opening for this valve, negative feedback and thus balancing is effected. Moreover, whenever fluid is pushed out through a given orifice, a large portion will be pushed back through the remaining orifices. This clearly increases negative feedback and thus balancing.

Valve opening unbalance results primarily from differences in net seal leakage leading into and out of the lift control chambers (for the case of the systems of FIGS. 1 and 2) and the combined valve-opening/lift control circuits (for the case of the system of FIG. 3). As differences in net leakage are unavoidable, the logical approach to minimize unbalance is to minimize the absolute magnitudes of seal leakages. Worst case analysis indicates that during one actuation cycle, the leakage volume can be less than 10 percent of the volume displaced by the valve actuator during engine idle. With balancing action, a relative valve lift error, which is considerably less than 10 percent should be possible.

A specially tight balance control is desired at or near idle since the small differences in valve opening result in a relatively high unbalance. A tight common mode control is also desirable at this point since a drift in the pressure setting of the pressure control valve may cause throttling to "kill" the engine. Fortunately, tightening both control modes is possible by simply limiting the displacement of the bypass pistons (as by limiting the length of their cylinders) so that it is slightly less than that of the cam follower pistons. Naturally, the displacement difference should be set to yield the minimum (idle) opening on the intake valves. In the system of FIG. 1, the bottoming of the bypass piston is now possible and causes the valve actuator to extend farther and expel the excess fluid. This sets the correct condition for the proper idle level on the subsequent actuation cycle. In the case of the system of FIG. 2, bottoming allows fluid to continue to enter the cavity so that a normal stop can take place on the subsequent cycle. In the case of the system of FIG. 3, the topping of the bypass piston may now result causing the pressure of the combined valve-opening/lift control circuit to drop and allow more fluid to enter. These cases suggest adjusting the spool idle position of the pressure control valve to cause a slight bottoming (or topping) condition since this will automatically equalize the idle points on all the engine cylinders.

System Turn-off Performance

During the engine turned-off period it is highly desirable that no fluid leaks out from the interior of the system and that the bypass piston as well as the valve actuator retains its last position. This avoids the use of starting time to prime and synchronize the system. To prevent leakage only one exit/entrance point is allowed in the entire system. The single return line leading from the pressure control valve and the pressure release valve to the oil sump is that single point. To prevent the bypass piston from gravitating, a simple elastomeric o-ring seal/latch similar to that of the baseline valve actuator is proposed. In these designs the elastomer pulls away from the sliding surface during system operation to avoid wear.

When the engine is turned off, fluid will enter and fill the lift control cavities of the systems of FIGS. 1 and 2 through the single return line. No cavity will be collapsed by motion of its member since this requires equal motion by the biased member. Such motion by the biased member is impossible since it will still be pegged against its return position; exactly the condition that caused the cavity itself to be formed. The entry of fluid through the lift control orifice will take place under atmospheric pressure since compliances C2 and C3 are decompressed by the shorting motion of the pressure release valve before the engine comes to a stop. In the event the cavity is closed and both members are extended from their return position at the instant the engine stops, no motion will again be imparted on the members since no pressure difference will exist across them. In addition, the latches will come into operation shortly after the decompression process and will assure that nothing moves once fluid flow originating at the cam followers ceases.

Simplified Control Options

Simplification of the systems of FIGS. 1, 2 and 3 is possible, provided a drop in rated engine speed is tolerable. Simplification stems from the similarly in function of the bias control circuit and the valve-closing circuit which allows these circuits to be combined. For example, in FIG. 1, the piston faces of the middle and bottom chambers of the bypass piston are combined into one face and only one corresponding valve-closing/bias control line (2,6) is required. The former intentional compliance (C3) of the bias control circuit is still needed to allow motion of the bypass piston and must be retained. Since this compliance will now be detrimental to system response during high speed operation, the pressure control of this line by the pressure control valve should be omitted and the line routed directly to the charging pump check valve, CV. The resulting higher pressure in this line can now maintain contact between the cams and cam followers at higher engine speeds inspite of the line compliance.

This unique simplification can also be applied to the valve actuators of the systems of FIGS. 2 and 3 to allow the use of only one valve-closing/bias control line. The simplified version for the system of FIG. 3, is shown on FIG. 4. In this system the valve-closing cam follower may be omitted since the valve-closing/bias control line must be made highly compliant; hence the advantage of providing a stiff flow source is lost. The only practical reason for retaining this unit is to reduce the fluid volume needed to lower the peak compression pressure.

Figure 4:
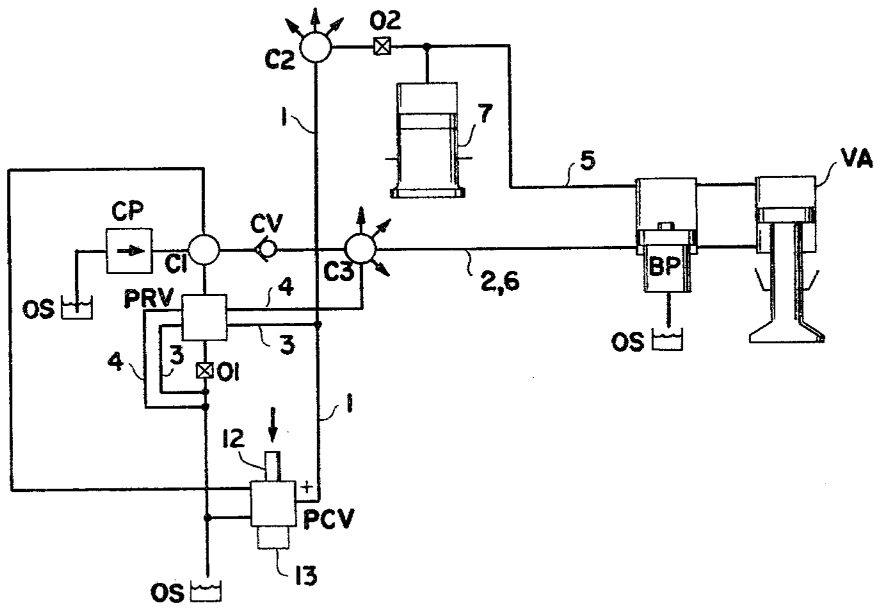
FIG. 4 shows in functional diagram form a simplified version of the system of FIG. 3.
Figure 6:
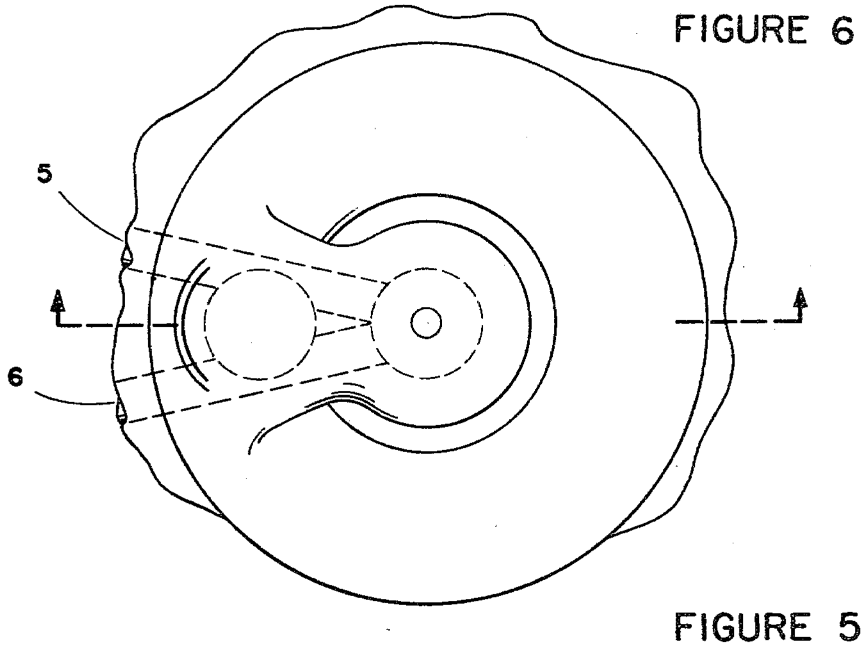
FIG. 6 shows the top view of the preferred design of the induction unit which satisfies the requirements of the system of FIG. 4 and incorporates the fuel metering portion of a fuel injection subsystem.

Using the system of FIG. 4 as an example typical areas for the actuator piston are 0.8 $cm^2$ for the valveopening face and 0.6 $cm^2$ for the valve-closing/bias control face leaving 0.2 $cm^2$ for the actuator shaft. The bypass piston areas of the valve-opening and valve-closing faces can be 0.8 $cm^2$ and 0.4 $cm^2$, respectively, leaving 0.4 $cm^2$ for the third chamber face. During the time the bypass piston is floated, the effective (added) bias on the actuator is equal to the pressure in the valve-closing/bias line acting on 0.2 $cm^2$, the difference in the 0.8 $cm^2$ and 0.6 $cm^2$ face areas of the actuator piston. The minimum pressure in this line which is determined by the charging pump circuit must be high enough to prevent atmospheric pressure acting on the rear side of the valve head from prematurely opening the valve. At high engine speed, the actuator bias may not be high enough to overcome the opening force (which is equal to the acceleration force on the floating bypass piston) and a slight valve opening may occur prior to the time that the auxiliary piston is stopped. The speed at which opening is imminent can be extended by lightening the bypass piston and enlarging its face areas in order to reduce its hydraulic inertance.

Choice of System Options

The estimated maximum rated speed for the various systems can be extrapolated from computer studies conducted on the baseline actuation system which indicate that continuous engine operation at speeds ranging from 16,000 RPM to 21,000 RPM is possible. For the systems of FIGS. 1, 2 and 3, the estimated rated speed is expected to drop somewhere between 9,000 and 16,000 RPM and for the simplified systems (typified by FIG. 4) between 6,000 and 12,000 RPM. The particular engine application will, of course, determine what dynamic range is required.

The system of FIG. 1 which yields a clipped-top (pedestal type) valve opening profile is better suited for those applications requiring the generation of small scale turbulence whereas the systems of FIGS. 2, 3 and 4 are better suited for those applications requiring small to medium scale turbulence plus the added feature of early valve closing.

Fuel Injection

The hydraulic variable lift concept can be borrowed to contrive a unique fuel injection subsystem for the overall induction system. In this subsystem, pressurized fuel from a regulated source is applied to a poppet-type fuel metering valve. The metering valve is periodically opened and closed with a known profile causing a known amount of fuel to be jetted. The metered fuel is routed to an accumulator from which fuel lines branch out to injection nozzles located inside the inlet ports of the induction units. The configuration as described provides a continuous spray of fuel. If now the periodic openings of the metering valve are governed by the lift control strategy and associated control components used for each of the engine's intake valves, such a controlled induction system can very accurately maintain a desired air-to-fuel mass ratio over the sonic flow range of the engine. It is clear that the fuel and air masses should track since at each valve actuation cycle the mass transferred is the integral of the respective valve apertures which track. Of course, a high pressure drop across the metering valve (relative to the fuel injectors) and the sonic flow condition must be maintained in order that downstream fuel pressure variations and engine cylinder pressure variations, respectively, do not affect flow rates. Also, the fuel pressure regulator must be responsive to atmospheric pressure and temperature in order to compensate for variations in these parameters.

In the above fuel injection concept, the fuel metering valve is controlled as if it were an added but unused intake valve of the engine; as for instance the "seventh" intake valve of a six-cylinder engine. In the preferred configuration, however, the fuel metering valve is actuated by one of the intake valve actuators. Of course, the lift amplitude of the actuator will be too large and must be highly attenuated before connection is made to the metering valve.

Although a shared fuel injection control concept is attractive from a cost standpoint, individual control is attractive from a fuel allocation accuracy standpoint since the profile of each metering valve aperture matches that of the corresponding intake valve. This option is particularly suited to 3-way emission control systems wherein the required tight control of the air/fuel mixture ratio may now be achieved without use of elaborate sensors and controls as currently practiced.

Figure 5:
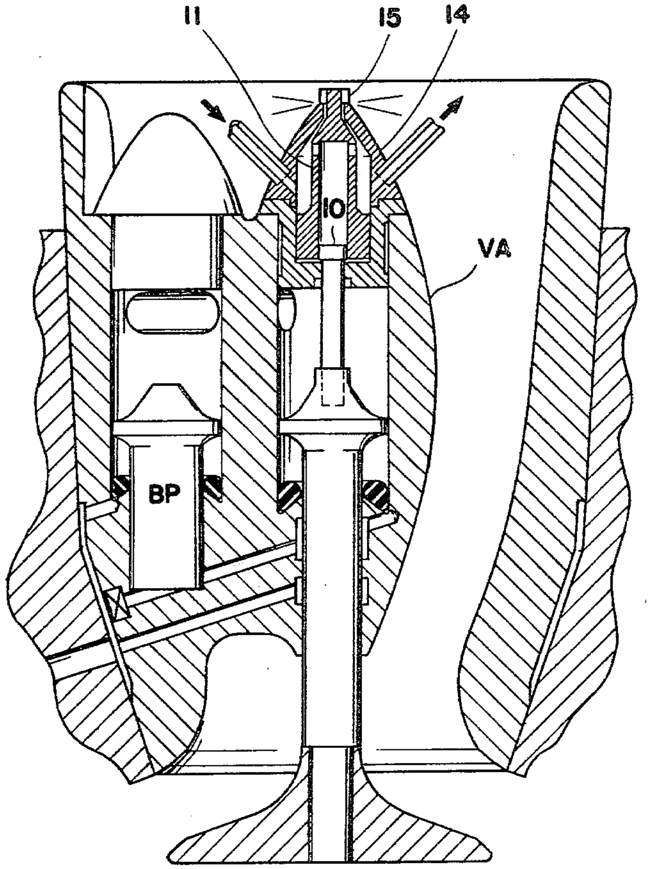
FIG. 5 shows in side elevation a cross section of the preferred design of the induction unit which satisfies the requirements of the system of FIG. 4 and incorporates the fuel metering portion of a fuel injection subsystem.

FIG. 5 shows the individual fuel injector design of this option. It mounts over the top of the valve actuator and uses the metering valve proper to spray the metered fuel across the path of the inlet air. Lift attenuation between the intake valve actuator and the metering valve is accomplished hydraulically and is equal to the ratio of the bottom area of the drive rod piston, 10, to the bottom area of the metering valve lift piston, 11.

Some amount of mixing of fuel and hydraulic fluid will take place in the lift chamber with time, but the exchange rate of this mixture with either fuel or fluid in the adjacent chambers is negligible. During operation the top face of the drive rod piston will cause a small volume of fuel to be alternately drawn in and pushed out of the fuel chamber. If this proves detrimental, the chamber at the top of the rod piston may be vented to the atmosphere through a center-line hole on the lift piston.

When the metering valve closes, a valve-closing bias must be maintained. This requires either a compression spring or that the fuel pressure be higher than the fluid pressure in the valve-opening circuit of the valve actuator. The latter approach is feasible since the pressure in the valve-opening circuit is reduced by the system during this period.

The interface of the fuel injector body and the valve actuator body includes an air gap for thermal isolation. This feature together with the pumping of fuel in and out of the fuel chamber and the flow of unheated air through the induction unit should maintain a safe fuel temperature. If, inspite of these features, fuel heating remains a problem, fuel circulation from the fuel pump through the injector and into the fuel pressure regulator can be advantageously employed as indicated in FIG. 5.

Dual Engine Displacement

Engines using an induction system of either FIGS. 1, 2, 3 or 4, but fitted with two pressure control valves, one for each of two sets of intake valves, each set corresponding to every other cylinder in the firing order, can be economically configured for dual displacement operation. In one unique system, the pressure control valves are connected differentially to the input (as through a walking beam) so that control force is applied equally to both spring-restrained spools. The restraining springs (contained in spring assembly, 13) are unequally biased so that with increasing input force one spool moves first from its stop (its idle point) position before the other. At some predetermined point both spools move until the first bottoms (its wide-open throttle point). Beyond this point only the second spool will advance until it too bottoms. Thus the engine is configured in its fill complement of cylinders at idle and at wideopen throttle and smoothly approaches the half complement of cylinders somewhere between these points. The system as described is hereby designated a "staggered progressive induction system".

A provision for delaying either control valve is desirable in order to balance engine wear. This can be accomplished by alternately shifting the otherwise fixed ends of the spool springs by means of solenoids; the desired shift amplitude precisely set by mechanical stops. With independently operated solenoids neither as well as either pressure control valve may be biased using self-toggling flip/flop control with manual override.

Induction Unit Design

The proposed induction unit for the system of FIG. 4 is shown in FIG. 5. Similar designs are proposed for the systems of FIGS. 1, 2 and 3. The axial flow inlet design with its numerous advantages is not new. It is the proposed configuration for the referenced baseline actuation system. Clearly, the inlet design advantageously satisfies the requirements of individual fuel injection by hydraulic actuation of the metering valves with the intake valve actuators.

Since an axial inlet flow design is conducive to laminar flow starting at the entrance and extending past the backside of the valve head, a nearly ideal converging nozzle results. This feature coupled with the fact that the unit can be die cast with smooth interior surfaces should appreciably extend the sonic range over the reported ⅝ load limit of conventional cross-flow valve ports having rough and irregular (sand cast) interior surfaces.

Loss of small scale turbulence intensity during wideopen throttle can be partly regained by imparting a swirl to the inlet gas. With high inlet flow rate and, proportionally, high swirl velocity, a breakup of the swirl into smaller eddies results once the gas enters the combustion chamber. Inlet swirl can be generated by off-setting the trailing edge of the support flange of the actuator body. Toward this end an opposite likewise shaped, support flange may be added to aid this effect. Contrary to conventional inlet ports, the concentric inlet design of the induction unit will not disrupt and dissipate the swirl formation prior to entry into the combustion chamber.

Throttling the engine with the intake valves provides the lower (external) shaft seals of the actuators with an exit pressure close to one atmosphere under all load conditions. This feature eliminates the need to set the oil sump ambient pressure to a low pressure (to which the shaft seal cavity must be vented) in order to minimize external fluid leakage. However, assuming no loss of fluid is required, the reciprocating motion of the bypass piston can again be utilized to produce the usual vacuum which may now be used to vent the seal cavity. The desired connection points of the return line to the third chamber are those shown in FIG. 5 with the exit portion containing the required orifice. The orifice will alternately admit sump ambient air and expel a mixture of leakage fluid and the admitted air as the bypass piston is made to reciprocate. The second return line provides the sole leakage path during wide-open throttle when the bypass piston is continuously bottomed.

The upper tip of the valve actuator piston and the well at the bottom of the actuator end cap mate to form a hydraulic snubber which cushions the seating of the valve. This feature is desired of all systems having a raised base (crest shaped) valve opening profile because the valves close with a finite velocity. The use of this snubber in conjunction with the low mass of the valve (which typically ranges from a mere five to nine grams if aluminum-lithium alloy is used) should prevent an audible pinging at valve closure.

The use of aluminum alloy for both the stem and head of the intake valves is possible since control fluid rapidly enters and exits the actuator with each opening and closing event providing direct liquid cooling of the very short (and now also very conductive) valve. Under this condition, a valve head temperature not higher than 200° C. can be maintained. The added heat load imposed on the fluid is nearly two-fold, but does not present a problem since the vast surface area of the system interconnecting lines will always hold the fluid temperature close to the engine cylinder head temperature which, in turn, is held close to the engine coolant temperature.

The body of the induction unit can be die cast out of aluminum alloy using a two-piece mold. The mold horizontal parting would start along the top outer edge of the inlet port, shift down to the levels where the maximum protrusions of the interior surfaces (those of the valve actuator and valve cage, respectively) lie, and terminate along the bottom end of the actuator. With precision die casting, machining is limited to honing the cylinders and shaft bores to final tolerances. Post machine treatment should include light anodizing of the body surface. The actuator shaft and piston and the bypass piston may likewise be die cast aluminum alloy members, ground machined and light anodized. Assembly can be permanent using modern electron beam or laser beam welding techniques. The entire unit is finally heat-shrunk inserted into machined cylinder head wells where connection is made to the various hydraulic circuits required by the unit.

A permanent assembly of the entire integrated induction unit is proposed since wear rates are practically nil and valve head durability is greatly enhanced by its lower operating temperature. The actuator piston/shaft (including the static seal/latch elastomer) is first inserted and held in the bottom position while the valve head is electron beam (or laser beam) welded. Next the bypass piston including its elastomer are inserted. The actuator end cap (which also serves as the outer cylinder for the fuel metering lift piston) and the bypass piston end cap are then positioned and electron (or laser) beam welded. The drive rod is then slipped through the actuator end cap and adhesive (blind) bonded to the actuator piston. Next the metering valve lift piston, 11, and seat, 14, are inserted and the seat likewise welded. Finally, the metering valve, 15, is positioned and welded.

The entire assembly, including handling and acceptance testing, lends itself to a fully automated operation. Even the adhesive bonding of the drive rod can be automated. For instance, two capsules of a two-part adhesive can be pre-inserted in the well of the actuator piston/shaft so that once the rod is inserted, simultaneous spinning and pressing will cause mixing and filling of the wall clearance.

I claim:

1. A hydraulic controlled sonic induction system including a hydraulic actuation system adapted to provide a prescribed lift profile to engine intake valves, said actuation system receives hydraulic fluid for effecting the opening of each of the said intake valves by a cam follower piston, said hydraulic fluid conveyed to an actuator/port unit by means of a valve-opening control line, said actuator/port unit containing a single-ended, doubleacting valve actuator including, a piston, an actuator, an actuator cylinder, a poppet valve, a valve seat and a valve port, the shaft of said actuator being connected with the stem of the valve, the top face of said actuator piston being connected with the face of said cam follower piston by means of said valve-opening control line, the bottom annular piston face of said actuator piston being connected to a valve-closing circuit, said valve-closing circuit consisting of a first fluid compliance, a third fluid compliance, a check valve allowing the passage of fluid from the first fluid compliance to the third fluid compliance, and a variable pressure source connected to said first compliance, the bottom annular face of the actuator piston being connected to the third fluid compliance of the valve-closing circuit by means of a valve-closing control line, said variable pressure source comprising a hydraulic fluid charging pump, a pressure release valve, and a flow restricting orifice, said pressure release valve and said flow restricting orifice being in series with each other and being connected in shunt with the charging pump, the pressure relief fluid of said pressure release valve is returned to a oil sump, through said flow restricting orifice said cam follower piston, said actuator piston, and said actuator shaft define sliding surface clearances within the interior of said cylinder and forming finite leakage seals therewith, the actuator shaft finite leakage seal, in turn, divided into interior and exterior seals with leakage from the interior seal returned to the oil sump, a retractable elastomeric seal in series with the finite leakage interior shaft seal for the purpose of positively containing the interior (control) fluid and for latching each of the intake valves at some time during the engine turn-off period, another retractable elastomeric seal in series with the finite leakage seal of the cam follower piston again for the purpose of holding the interior fluid during the engine turn-off period, said hydraulic controlled induction system further includes lift control members for varying the opening of said intake valves, said control members comprising (1) a bypass piston contained in each of said intake valve actuator/port units and connected therein in parallel with the actuator piston through the valve-opening control line to a first bypass piston chamber and through the valve-closing control line to a second bypass piston chamber, (2) a flow distribution orifice connected to each of the valve-opening control lines, (3) a second fluid compliance means being connected to the flow distribution orifices that lead to the valve-opening control lines, and (4) a three-way pressure control valve, a supply pressure port thereof being connected to said first fluid compliance means, a return port thereof being connected to the oil sump and a control pressure port thereof being connected to said second fluid compliance means, the two sliding surface clearances of said bypass piston form two finite leakage seals with leakage from the finite leakage seal of the smaller diameter being returned to the oil sump, a retractable elastomeric seal in series with the smaller diameter finite leakage seal for the purpose of positively holding the interior (control) fluid and latching the bypass piston corresponding to each of the intake valves at sometime during the engine turn-off period.

2. The system as set forth in claim 1 in which the balancing of the intake valve openings of a multiplecylinder engine is aided near the idle operating point by mechanically limiting the travel of the bypass pistons by means of their extreme top and bottom surfaces such that the amount of fluid that can be bypassed from the valve-opening control lines is less than the amount of fluid that can be supplied by the cam follower pistons to said lines, the difference of said supplied and bypassed fluid is set by design to yield the minimum required idle opening of the intake valves.

3. The system as set forth in claim 1 in which the body of the valve actuator/port unit is formed in one piece with the port, the valve seat and the valve actuator all concentrically arranged, said actuator being supported by at least one flange and set deep in the port in order to allow the use of a short valve stem, said at least one flange containing the bypass piston and the valve-opening and valve-closing control lines through which the bypass piston and valve actuator are parallel connected, the surfaces of the valve actuator, the flanges and the port interior are contoured into a streamlined, annular shaped, converging nozzle with the back face of the poppet valve, a third chamber of said bypass piston being restrictively ported to the oil sump through the ambient air and directly ported to the space between the interior and exterior actuator shaft seals from a point in a bypass piston cylinder which is above the bottom stop surface of the third chamber in order that motion of the bypass piston may generate a vacuum in said third chamber for scavenging fluid leakage from the interior shaft seal, thus preventing leakage across the exterior shaft seal, the periphery of said body tapered in order to allow a tight fit of the unit with the cylinder head for easy removal of the unit.

4. The system as set forth in claim 1 includes a body to which fuel injection metering members are added to each intake valve actuator/port unit to form a complete, air and fuel, induction unit, said fuel injection metering members comprises a drive rod connected to the top end of the actuator shaft, a hydraulic attentuator driven by said rod and formed by a small piston area acting through hydraulic fluid on a large piston area, a fuel metering valve also used to spray the metered fuel inside the port of said induction unit, the small piston area of said hydraulic attenuator provided by a piston attached to the top end of said drive rod and forming therewith a small annular area, the large piston area of said hydraulic attenuator provided by the large bottom face of a fuel metering valve lift piston, the body of said fuel injection metering members mounted over the top of the actuator, said body containing a fuel chamber at its top end, said fuel chamber being supplied with pressure regulated fuel which acts over the top face of the fuel metering valve lift piston to effect a closing bias as well as fuel metering valve, the exterior surface of said body blending with the exterior surface of the actuator to form a single streamlined surface, said fuel metering members providing the means for the injection of fuel which is proportioned to the sonic induction of air through the intake valves.

* * * * *